United States Patent [19]

Spensberger

[11] Patent Number: 4,477,214

[45] Date of Patent: Oct. 16, 1984

[54] MACHINE FOR THE PRECISION WORKING OF THE TOOTH SURFACES ON TOOTHED WORKPIECES

[75] Inventor: Johann Spensberger, Poing, Fed. Rep. of Germany

[73] Assignee: Carl Hurth Maschinen- und Zahnradfabrik GmbH & Co., Fed. Rep. of Germany

[21] Appl. No.: 382,327

[22] Filed: May 26, 1982

[30] Foreign Application Priority Data

Jun. 13, 1981 [DE] Fed. Rep. of Germany ....... 3123502

[51] Int. Cl.³ .............................................. B23F 19/06
[52] U.S. Cl. .................................... 409/34; 29/159.2; 51/32; 51/52 R; 409/37; 409/49
[58] Field of Search ............. 409/32, 33, 49, 36, 409/37, 2, 3, 31, 34, 35; 29/159.2; 51/32, 52 R

[56] References Cited

U.S. PATENT DOCUMENTS

| | | | |
|---|---|---|---|
| 2,762,268 | 9/1956 | Maurer | 409/33 X |
| 3,188,915 | 6/1965 | Hurth | 409/33 |
| 3,272,075 | 9/1966 | Gates | 409/32 |
| 3,731,591 | 5/1973 | Tersch et al. | 409/33 |
| 4,359,301 | 11/1982 | Spensberger | 409/32 X |

FOREIGN PATENT DOCUMENTS

| | | | |
|---|---|---|---|
| 2058627 | 4/1981 | United Kingdom | 409/33 |
| 2100155 | 12/1982 | United Kingdom | 409/33 |
| 2105625 | 3/1983 | United Kingdom | 409/32 |
| 176169 | 2/1964 | U.S.S.R. | 409/49 |

Primary Examiner—William R. Briggs
Attorney, Agent, or Firm—Flynn, Thiel, Boutell & Tanis

[57] ABSTRACT

A machine for the precision working of tooth surfaces on a toothed workpiece stationarily but rotatably mounted on a machine frame, by using a tool, for example a shaving gear, arranged above the workpiece and which is rotatably drivable. The tool is mounted on a tool carrier which in turn is mounted on a guide carrier, which tool carrier is longitudinally movable and which is swingably suspended on a horizontal bolt. The tool carrier has a guide arm which is guided in a pivot member. The horizontal bolt, which for the purpose of adjusting the feed direction can be rotated about a vertical axis, is also adjustably inclinable in a vertical plane to enable the production of slightly conical teeth according to an underpass machining method.

2 Claims, 5 Drawing Figures

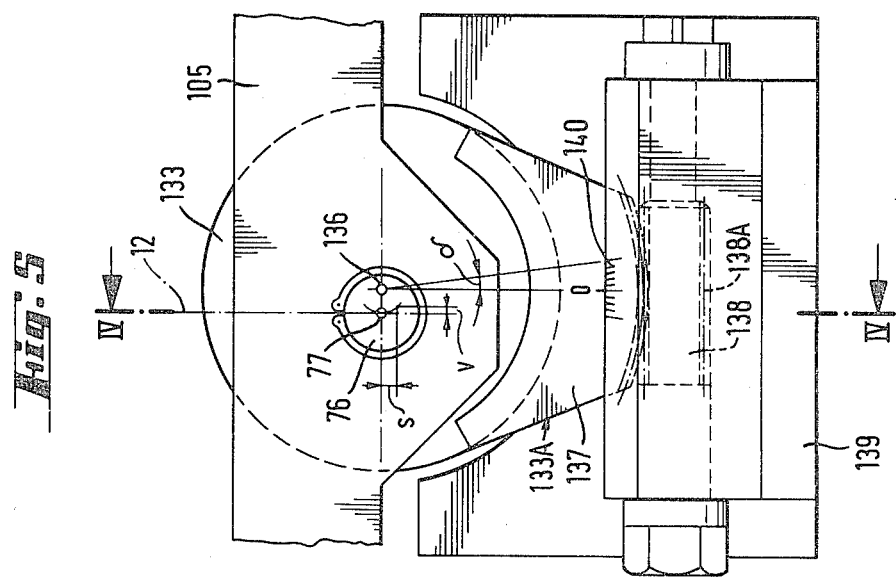
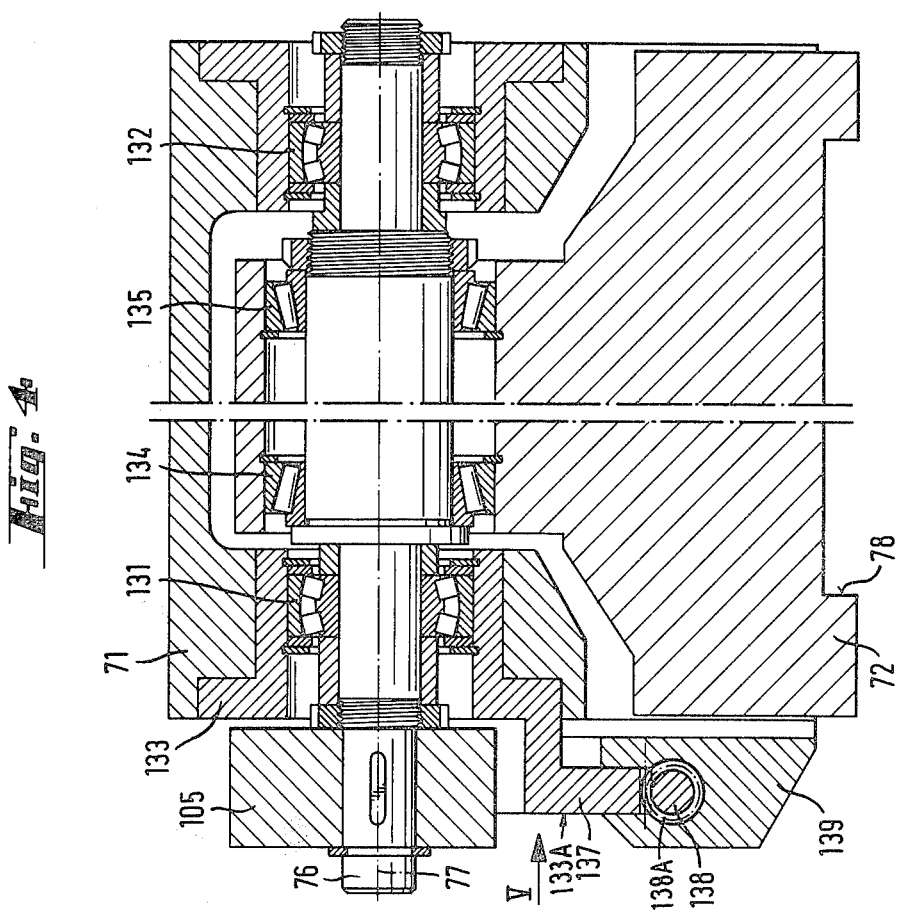

MACHINE FOR THE PRECISION WORKING OF THE TOOTH SURFACES ON TOOTHED WORKPIECES

CROSS-REFERENCE TO RELATED APPLICATIONS

This application is related to copending application (1) Ser. No. 467,425, filed Feb. 17, 1983, which is a continuation of Ser. No. 129,769, filed Mar. 12, 1980 and (2) Ser. No. 168 218, filed July 10, 1980, now U.S. Pat. No. 4,359,301.

FIELD OF THE INVENTION

The invention relates to a machine for the precision working of the tooth surfaces on toothed workpieces.

BACKGROUND OF THE INVENTION

In the machines according to Ser. No. 467 425, filed Feb. 17, 1983 and U.S. Pat. No. 4,359,301 it is possible to create with a suitably formed guide arm slightly conical teeth on a gear which is to be worked. A longitudinal movement of the tool carrier or the tool occurs then in a direction which is inclined vertically with respect to the workpiece axis.

Conical teeth can also be created by using a straight guide arm, if the arm which is mounted on the tool carrier and which carries the guide arm is adjustable in its length. Through this arrangement an inclination of the tool carrier and thus, also of the guide carrier is achieved. A longitudinal movement of the tool carrier or the tool occurs then in a direction which is inclined vertically with respect to the workpiece axis corresponding with the desired conicity. (see U.S. Pat. No. 4,359,301).

Both variations can be used during parallel and diagonal shaving. However, in the case of underpass or tangential shaving the swivel plate is swivelled with the guide carrier through 90° or approximately 90° with respect to the workpiece axis. An inclination of the tool axis with respect to the workpiece axis cannot be achieved in this position neither with a suitably formed guide arm nor with a change of the length of the arm which carries a straight guide arm. Conical teeth cannot be created by means of the adjustment of devices in this machine.

Therefore, the basic purpose of the invention is to provide a machine capable of forming conical teeth during underpass or tangential shaving and during other similarly running methods.

The purpose is inventively attained with a machine having a tiltable bolt therein from which the tool is suspended. This arrangement makes it possible to incline the feed carriage and thus the tool axis at a desired angle with respect to the workpiece axis.

BRIEF DESCRIPTION OF THE DRAWINGS

The invention will be described hereinafter with reference to one exemplary embodiment illustrated in FIGS. 1 to 5 in which:

FIG. 4 is a partial cross-sectional view of the swivel plate taken along the line IV—IV of FIG. 5; and FIG. 5 is a partial end view of the swivel plate as viewed along the arrow V in FIG. 5.

DETAILED DESCRIPTION

Figure 1:
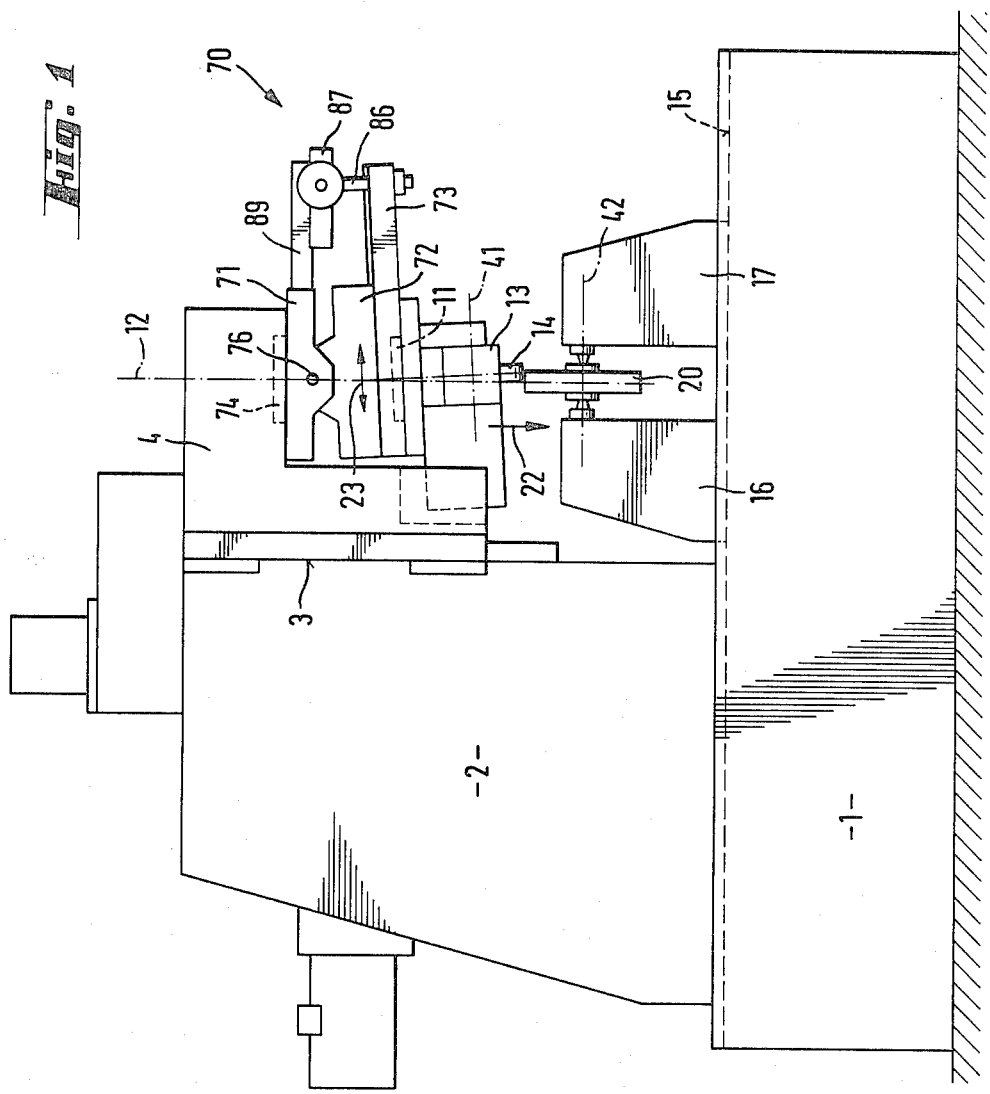
FIG. 1 illustrates a machine embodying the invention.

A vertical column 2 is rigidly mounted at one end on a machine bed or frame (FIG. 1). A vertical carriage 4 is guided for vertical adjustment on a column 2 in a vertical guide or slide bar 3, which faces toward the free end of the bed 1. The vertical carriage 4 at least partially projects over the free end of the bed. The devices which are needed for effecting this vertical movement are not illustrated and do not need to be described since they are of no importance for the invention. However, reference to copending application Ser. No. 467 425, filed Feb. 17, 1983 and U.S. Pat. No. 4,359,301 is to be incorporated herein. The vertical carriage 4 has mounted on its underside an adjusting carriage 70, which will be described in more detail below. A tool head 13 which is rotatable about a vertical axis 12 is received on the underside of the adjusting carriage in a circular guide 11. This structure enables the crossed-axes angle between the tool axis 41 and the workpiece axis 42 to be adjusted. (The axis 12 is identical with the common normal between the tool 14 and the workpiece 20). A rotatably driven tool 14 is supported on the tool head 13. The tool 14 may be a conventional toothed shaving gear or a different tool suited for the precision working of teeth on a toothed workpiece. The tool projects downwardly from the bottom of the tool head.

Tailstocks 16, 17 are longitudinally movably mounted and fixedly securable in a conventional guide 15 on the machine bed 1 and are adapted to receive the workpiece 20 therebetween. To work the workpiece 20, the tool 14 is moved in a direction 22 toward the workpiece and meshingly engages same. The structure required to enable this movement is known and will not be discussed further.

The adjusting carriage 70 (FIG. 2) consists substantially of three parts which are movably arranged with respect to one another, namely, a swivel plate 71, a guide carrier 72 and a feed carriage 73. The swivel plate 71 is pivotally mounted for movement about a vertical axis coinciding with the axis 12, and is fixedly secured in a tensioned circular guide 74 in the vertical carriage 4. This structure enables an adjustment of the feed direction 75, 75' of the tool 14 as desired during parallel, diagonal or underpass shaving. The guide carrier 72 is tiltably suspended about a horizontal axis 77 defined by a bolt 76 on the swivel plate 71. This will be discussed in detail below. The guide carrier 72 has suspended from the underside thereof the feed carriage 73 in an initially tensioned longitudinal guide 78. The longitudinal guide 78 is directed transversely to the axis 77. The structure for moving the feed carriage 73 is known just as for the structure enabling a rotary adjustment of the swivel plate 71 or of the tool head 13 and are not described here. They are also not illustrated.

The feed carriage 73 (FIG. 2) has at one end an upwardly directed arm 86 which is adjustable in its length and on the free end of which arm a guide arm 87 is mounted. The guide arm 87 is pivotal about a horizontal axis 88, which axis extends parallel to the tilting axis 77, and can be fixedly secured on the arm 86. The swivel plate 71 has an arm 89, at the free end of which is freely rotatably hinged a pivot member 90. The pivot member 90 has a slot therein and the arm 87 is guided in the slot.

Figure 2:
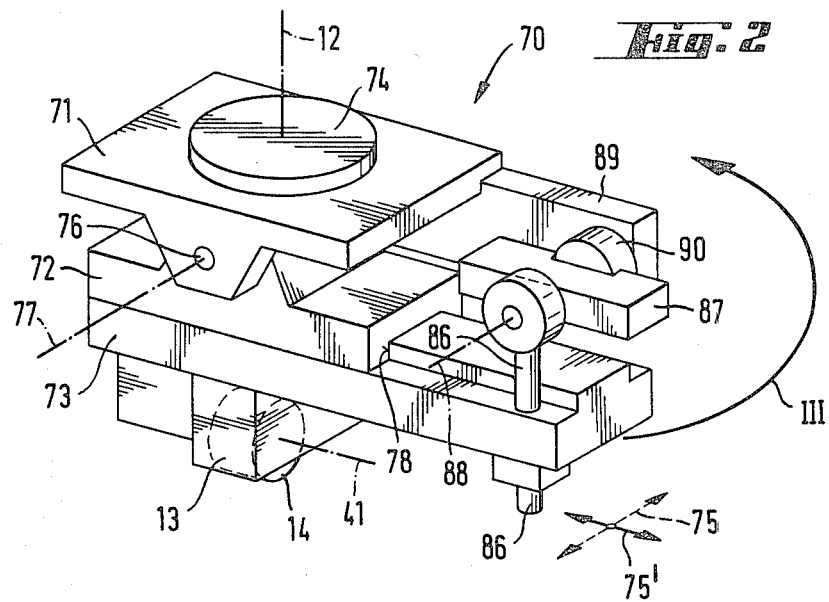
FIG. 2 is a perspective view of the adjusting carriage in an adjusted position for achieving parallel shaving.
Figure 3:
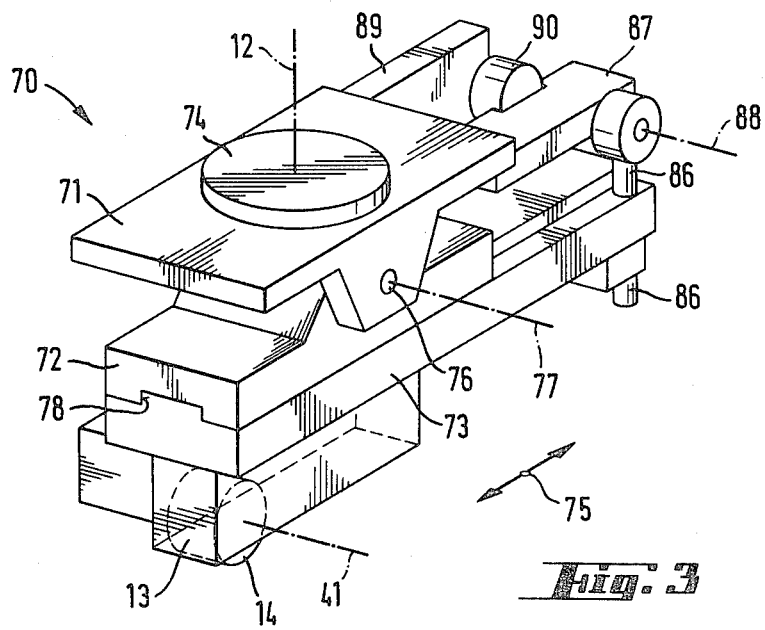
FIG. 3 is also a perspective view of the adjusting carriage in an adjusted position for achieving underpass shaving.

The length of the arm 86 is adjusted as a rule so that the feed carriage 73 is positioned horizontally. Then it is possible to work normal or conventional teeth or-in the case of an inclined guide arm 87-also crowned teeth. A shortening or lengthening of the arm 86 compared with its length which is illustrated in FIG. 2 results in an inclination of the feed carriage 73 counterclockwise to the left (FIG. 1) about the axis 77. A lengthening of the arm causes a clockwise movement to the right. If the feed carriage is moved to the left or right (arrow 23 in FIG. 1), then it moves corresponding with its inclined position in a plane which is inclined with respect to the workpiece axis. The teeth which are to be worked become conical. It is a condition for this that the guide bar 87 is adjusted horizontally and is fixedly clamped. A further condition is that a parallel or diagonal method is used. As the angle between the feed direction and the workpiece axis increases, the effect of the inclined position of the feed carriage becomes less, namely at an increasing angle the conicity is reduced. FIG. 3 illustrates the adjusting carriage 70 rotated 90° for purposes of achieving an underpass shaving compared with the orientation of FIG. 2, and at the same crossed-axes angle between the tool and the workpiece. It will be clearly recognized that with the above-described inclinded position of the feed carriage conical teeth cannot be produced. The same is true if a straight guide arm 87 and an arm 86 which is adjustable in its length are not used, but instead a curved guide arm is used.

In order to be able to make conical teeth, the machine is therefore provided with the device illustrated in FIGS. 4 and 5. The bolt 76 defining the axis 77 is supported in the swivel plate 71 by means of self-aligning roller bearings 131, 132, whereby adjacent one end of the bolt 76 there is arranged on eccentric sleeve 133 between the swivel plate 71 and the self-aligning roller bearing 131. The same or a similar eccentric sleeve can, if desired, be arranged adjacent the opposite end. However, in this embodiment, only one eccentric sleeve 133 is provided. A lever 105 of a conventional correcting mechanism to enable a crownshaving is mounted at the outboard end of the bolt 76 adjacent the eccentric sleeve 133. The guide carrier 72 is suspended on the bolt 76 from roller bearings 134, 135 located axially inwardly of the bearings 131 and 132. The eccentric sleeve 133 is rotatable through a small angle δ (FIG. 5) about its axis 136 in the swivel plate 71. The eccentric sleeve is provided with an extension 133A having a tooth segment 137 thereon meshingly engaging a worm gear 138A mounted on a rotatable shaft 138. The worm shaft 138 is rotatably supported in an attachment 139 on the swivel plate 71. By rotating the worm shaft 138, the tooth segment 137 and thus the eccentric sleeve 133 is rotated, whereby the axis 77 of the bolt 76 is lifted or lowered on one side only of the guide carrier 72 by an amount s. By lifting or lowering the bolt 76, the guide carrier 72 and thus the tool 14 simultaneously lifted or lowered on one side, namely the tool axis 41 becomes inclined to the horizontal. The angle δ through which the eccentric sleeve 133 is rotated can be read on a scale provided on the attachment 139. The one-sided horizontal shifting v, which is created simultaneously during the lifting and lowering because of the rotary movement of the eccentric sleeve 133, is negligably small.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A machine for precision working of tooth flanks on a toothed workpiece rotatably supported in a machine frame by a rotatably supported toothed tool, comprising:

frame means;

adjusting carriage means and a swivel plate means for pivotally suspending said adjusting carriage means from said frame means and for movement about a first axis perpendicular to the axis of rotation of said workpiece, said adjusting carriage means including a guide carrier pivotally suspended by a horizontally extending bolt from said swivel plate means, a feed carriage movably mounted on said guide carrier, circular guide means for pivotally suspending said rotatably supported toothed tool from said feed carriage and for rotatable movement about a second axis perpendicular to the axis of rotation of said workpiece for purposes of achieving a crossed axes relationship between said axis of rotation of said workpiece and the axis of rotation of said tool;

first control means for effecting varying tilting of said feed carriage about the axis of said bolt; and second control means for adjusting the angle of inclination to the horizontal of said axis of said bolt in a vertical extending plane to alter the inclination of said feed carriage about the longitudinal axis of said movement thereof, said feed carriage being movable in a direction generally perpendicular to said vertical extending plane for producing a crowned surface on the teeth of said workpiece.

2. The machine according to claim 1, wherein said second control means includes self-aligning roller bearing means rotatably supporting said bolt, of which at least one is arranged in a rotatable eccentric sleeve rotatably supported in said swivel plate means.

* * * * *